(12) United States Patent
DeHaan et al.

(10) Patent No.: US 8,892,700 B2
(45) Date of Patent: Nov. 18, 2014

(54) COLLECTING AND ALTERING FIRMWARE CONFIGURATIONS OF TARGET MACHINES IN A SOFTWARE PROVISIONING ENVIRONMENT

(75) Inventors: Michael Paul DeHaan, Morrisville, NC (US); Adrian Karstan Likins, Raleigh, NC (US); Seth Kelby Vidal, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 611 days.

(21) Appl. No.: 12/393,319

(22) Filed: Feb. 26, 2009

(65) Prior Publication Data
US 2010/0217843 A1 Aug. 26, 2010

(51) Int. Cl.
*G06F 15/177* (2006.01)
*G06F 9/445* (2006.01)

(52) U.S. Cl.
CPC .................................. *G06F 8/65* (2013.01)
USPC .......................................... 709/221; 717/178

(58) Field of Classification Search
USPC .................................................. 717/168–178
See application file for complete search history.

(56) References Cited

U.S. PATENT DOCUMENTS

| | | | |
|---|---|---|---|
| 5,787,246 A * | 7/1998 | Lichtman et al. .............. 709/220 |
| 5,835,719 A | 11/1998 | Gibson et al. |
| 5,948,062 A | 9/1999 | Tzelnic et al. |
| 6,105,100 A | 8/2000 | Dean et al. |
| 6,212,585 B1 | 4/2001 | Chrabaszcz |
| 6,243,747 B1 | 6/2001 | Lewis et al. |
| 6,272,536 B1 | 8/2001 | van Hoff et al. |
| 6,381,742 B2 | 4/2002 | Forbes et al. |
| 6,415,289 B1 | 7/2002 | Williams et al. |
| 6,438,711 B2 | 8/2002 | Woodruff |
| 6,516,427 B1 | 2/2003 | Keyes et al. |
| 6,526,442 B1 | 2/2003 | Stupek et al. |
| 6,550,021 B1 | 4/2003 | Dalphy et al. |
| 6,557,169 B1 | 4/2003 | Erpeldinger |
| 6,594,664 B1 | 7/2003 | Estrada et al. |
| 6,625,742 B1 | 9/2003 | Owhadi et al. |
| 6,686,838 B1 | 2/2004 | Rezvani et al. |
| 6,751,659 B1 | 6/2004 | Fenger et al. |
| 6,757,837 B1 | 6/2004 | Platt et al. |
| 6,769,022 B1 | 7/2004 | DeKoning et al. |
| 6,779,004 B1 | 8/2004 | Zintel |
| 6,845,464 B2 | 1/2005 | Gold |
| 6,865,737 B1 | 3/2005 | Lucas et al. |
| 6,947,939 B2 | 9/2005 | Fujibayashi et al. |
| 6,986,033 B2 | 1/2006 | Miyamoto et al. |

(Continued)

OTHER PUBLICATIONS

DeHaan, "Systems and Methods for Providing Configuration Management Services from a Provisioning Server", U.S. Appl. No. 12/414,941, filed Mar. 31, 2009.

(Continued)

*Primary Examiner* — Jerry Dennison
(74) *Attorney, Agent, or Firm* — Lowenstein Sandler LLP (57) ABSTRACT

A provisioning server can provide and interact with a firmware tool on target machines. The firmware tool can communicate with the firmware of the target machines and collect data representing the configuration of the firmware of the target machines, independent of the types of the target machines. To communicate independent of the type of target machine, the firmware tool can include a translation library. The translation library enables the firmware tool to receive common instructions for interacting with firmware and convert those common instructions into specific instructions that are compatible with different types of the target machines.

21 Claims, 4 Drawing Sheets

(56) References Cited

U.S. PATENT DOCUMENTS

| | | |
|---|---|---|
| 7,013,461 B2 | 3/2006 | Hellerstein et al. |
| 7,051,101 B1 | 5/2006 | Dubrovsky et al. |
| 7,107,330 B1 | 9/2006 | Hamilton et al. |
| 7,133,822 B1 | 11/2006 | Jacobson |
| 7,165,109 B2 | 1/2007 | Chiloyan et al. |
| 7,185,071 B2 | 2/2007 | Berg et al. |
| 7,200,845 B2 | 4/2007 | Morrison et al. |
| 7,340,637 B2 | 3/2008 | Nagoya |
| 7,350,112 B2 | 3/2008 | Fox et al. |
| 7,356,679 B1 | 4/2008 | Le et al. |
| 7,395,322 B2 | 7/2008 | Harvey et al. |
| 7,506,040 B1 | 3/2009 | Rabe et al. |
| 7,506,151 B2 | 3/2009 | Miyamoto et al. |
| 7,516,218 B2 | 4/2009 | Besson |
| 7,519,691 B2 | 4/2009 | Nichols et al. |
| 7,574,481 B2 | 8/2009 | Moore et al. |
| 7,600,005 B2 | 10/2009 | Jamkhedkar et al. |
| 7,606,868 B1 | 10/2009 | Le et al. |
| 7,640,325 B1 | 12/2009 | DeKoning et al. |
| 7,681,080 B2 | 3/2010 | Abali et al. |
| 7,716,316 B2 | 5/2010 | Nichols et al. |
| 7,734,717 B2 | 6/2010 | Saarimaki et al. |
| 7,827,261 B1 | 11/2010 | Griswold et al. |
| 7,831,997 B2 | 11/2010 | Eldar et al. |
| 7,937,437 B2 | 5/2011 | Fujii |
| 8,085,808 B2* | 12/2011 | Brusca et al. ............ 370/466 |
| 8,122,111 B2* | 2/2012 | Shekar CS et al. ........ 709/221 |
| 2002/0062259 A1 | 5/2002 | Katz et al. |
| 2002/0078186 A1 | 6/2002 | Engel et al. |
| 2002/0138567 A1 | 9/2002 | Ogawa |
| 2002/0162028 A1 | 10/2002 | Kennedy |
| 2003/0005097 A1 | 1/2003 | Barnard et al. |
| 2003/0055919 A1 | 3/2003 | Fong et al. |
| 2003/0069884 A1 | 4/2003 | Nair et al. |
| 2003/0069946 A1* | 4/2003 | Nair et al. ............ 709/220 |
| 2003/0070110 A1 | 4/2003 | Aija et al. |
| 2003/0074549 A1 | 4/2003 | Paul et al. |
| 2003/0110173 A1 | 6/2003 | Marsland |
| 2003/0119480 A1 | 6/2003 | Mohammed |
| 2003/0126585 A1 | 7/2003 | Parry |
| 2003/0195921 A1 | 10/2003 | Becker et al. |
| 2003/0212992 A1 | 11/2003 | Ronning et al. |
| 2004/0006616 A1 | 1/2004 | Quinn et al. |
| 2004/0015831 A1 | 1/2004 | Bowhill |
| 2004/0015957 A1 | 1/2004 | Zara et al. |
| 2004/0019876 A1 | 1/2004 | Dravida et al. |
| 2004/0024984 A1 | 2/2004 | Lanzatella et al. |
| 2004/0044643 A1 | 3/2004 | deVries et al. |
| 2004/0054789 A1 | 3/2004 | Breh et al. |
| 2004/0059703 A1 | 3/2004 | Chappell et al. |
| 2004/0064501 A1 | 4/2004 | Jan et al. |
| 2004/0128375 A1* | 7/2004 | Rockwell .............. 709/223 |
| 2004/0143664 A1 | 7/2004 | Usa et al. |
| 2004/0167975 A1 | 8/2004 | Hwang et al. |
| 2004/0215755 A1 | 10/2004 | O'Neill |
| 2004/0223469 A1 | 11/2004 | Bahl et al. |
| 2005/0028025 A1 | 2/2005 | Zalewski et al. |
| 2005/0050175 A1 | 3/2005 | Fong et al. |
| 2005/0114474 A1 | 5/2005 | Anderson et al. |
| 2005/0125525 A1* | 6/2005 | Zhou et al. .............. 709/223 |
| 2005/0177829 A1 | 8/2005 | Vishwanath |
| 2005/0182796 A1 | 8/2005 | Chu et al. |
| 2005/0198629 A1 | 9/2005 | Vishwanath |
| 2005/0223374 A1 | 10/2005 | Wishart et al. |
| 2006/0041767 A1 | 2/2006 | Maxwell et al. |
| 2006/0080659 A1 | 4/2006 | Ganji |
| 2006/0095230 A1 | 5/2006 | Grier et al. |
| 2006/0095702 A1 | 5/2006 | Hickman et al. |
| 2006/0155857 A1 | 7/2006 | Feenan et al. |
| 2006/0173912 A1 | 8/2006 | Lindvall et al. |
| 2006/0174018 A1 | 8/2006 | Zhu et al. |
| 2006/0190575 A1 | 8/2006 | Harvey et al. |
| 2006/0190773 A1 | 8/2006 | Rao et al. |
| 2006/0200658 A1* | 9/2006 | Penkethman ............ 713/2 |
| 2006/0215575 A1 | 9/2006 | Horton et al. |
| 2006/0218544 A1 | 9/2006 | Chakraborty et al. |
| 2006/0230165 A1 | 10/2006 | Zimmer et al. |
| 2006/0282479 A1 | 12/2006 | Johnson et al. |
| 2007/0015538 A1 | 1/2007 | Wang |
| 2007/0022409 A1* | 1/2007 | Levenshteyn ............ 717/136 |
| 2007/0067419 A1 | 3/2007 | Bennett |
| 2007/0101118 A1 | 5/2007 | Raghunath et al. |
| 2007/0118654 A1 | 5/2007 | Jamkhedkar et al. |
| 2007/0168721 A1* | 7/2007 | Luiro et al. ............ 714/15 |
| 2007/0169093 A1 | 7/2007 | Logan et al. |
| 2007/0192158 A1 | 8/2007 | Kim |
| 2007/0204338 A1 | 8/2007 | Aiello et al. |
| 2007/0226810 A1 | 9/2007 | Hotti |
| 2007/0244996 A1 | 10/2007 | Ahmed et al. |
| 2007/0276905 A1 | 11/2007 | Durand et al. |
| 2007/0288612 A1 | 12/2007 | Hall |
| 2007/0294376 A1* | 12/2007 | Ayachitula et al. .......... 709/220 |
| 2007/0299951 A1 | 12/2007 | Krithivas |
| 2008/0028048 A1* | 1/2008 | Shekar CS et al. .......... 709/220 |
| 2008/0040452 A1 | 2/2008 | Rao et al. |
| 2008/0046708 A1 | 2/2008 | Fitzgerald et al. |
| 2008/0059959 A1* | 3/2008 | Chen et al. ............ 717/168 |
| 2008/0130639 A1 | 6/2008 | Costa-Requena et al. |
| 2008/0189693 A1 | 8/2008 | Pathak |
| 2008/0196043 A1 | 8/2008 | Feinleib et al. |
| 2008/0235266 A1* | 9/2008 | Huang et al. ............ 707/102 |
| 2008/0235361 A1 | 9/2008 | Crosbie et al. |
| 2008/0244325 A1 | 10/2008 | Tyulenev |
| 2008/0270674 A1 | 10/2008 | Ginzton |
| 2008/0294777 A1 | 11/2008 | Karve et al. |
| 2008/0301666 A1 | 12/2008 | Gordon et al. |
| 2008/0313716 A1 | 12/2008 | Park |
| 2008/0320110 A1 | 12/2008 | Pathak |
| 2009/0007091 A1* | 1/2009 | Appiah et al. ............ 717/171 |
| 2009/0055901 A1 | 2/2009 | Kumar et al. |
| 2009/0064132 A1* | 3/2009 | Suchy et al. ............ 717/177 |
| 2009/0089567 A1 | 4/2009 | Boland et al. |
| 2009/0089852 A1 | 4/2009 | Randolph et al. |
| 2009/0106291 A1 | 4/2009 | Ku et al. |
| 2009/0129597 A1 | 5/2009 | Zimmer et al. |
| 2009/0132682 A1 | 5/2009 | Counterman |
| 2009/0132710 A1* | 5/2009 | Pelley ............ 709/226 |
| 2009/0158148 A1* | 6/2009 | Vellanki et al. ............ 715/700 |
| 2009/0158272 A1 | 6/2009 | El-Assir et al. |
| 2009/0164522 A1 | 6/2009 | Fahey |
| 2009/0165099 A1 | 6/2009 | Eldar et al. |
| 2009/0172430 A1 | 7/2009 | Takenouchi |
| 2009/0240835 A1 | 9/2009 | Adelman et al. |
| 2009/0259665 A1 | 10/2009 | Howe et al. |
| 2009/0265707 A1* | 10/2009 | Goodman et al. ............ 718/1 |
| 2009/0282404 A1 | 11/2009 | Khandekar et al. |
| 2009/0285199 A1 | 11/2009 | Strahs et al. |
| 2010/0023740 A1 | 1/2010 | Moon et al. |
| 2010/0057833 A1* | 3/2010 | DeHaan ............ 709/203 |
| 2010/0057913 A1* | 3/2010 | DeHaan ............ 709/226 |
| 2010/0100876 A1* | 4/2010 | Glover et al. ............ 717/178 |
| 2010/0217837 A1* | 8/2010 | Ansari et al. ............ 709/218 |
| 2010/0217840 A1* | 8/2010 | Dehaan et al. ............ 709/220 |
| 2010/0217843 A1* | 8/2010 | Dehaan et al. ............ 709/221 |
| 2010/0217944 A1* | 8/2010 | DeHaan et al. ............ 711/156 |
| 2010/0220584 A1 | 9/2010 | DeHaan et al. |
| 2010/0223504 A1* | 9/2010 | DeHaan et al. ............ 714/37 |
| 2010/0223608 A1 | 9/2010 | DeHaan et al. |
| 2010/0223609 A1 | 9/2010 | DeHaan et al. |
| 2010/0293541 A1* | 11/2010 | Pall et al. ............ 717/178 |

OTHER PUBLICATIONS

DeHaan, "Systems and Methods for Retiring Target Machines by a Provisioning Server", U.S. Appl. No. 12/475,427, filed May 29, 2009.

DeHaan, "Methods and Systems for Centrally Managing Multiple Provisioning Servers", U.S. Appl. No. 12/201,193, filed Aug. 29, 2008.

DeHaan, "Methods and Systems for Assigning Provisioning Servers in a Software Provisioning Environment", U.S. Appl. No. 12/201,646, filed Aug. 29, 2008.

(56) References Cited

OTHER PUBLICATIONS

DeHaan, "Methods and Systems for Providing Remote Software Provisioning to Machines", U.S. Appl. No. 12/195,633, filed Aug. 21, 2008.
DeHaan, "Systems and Methods for Storage Allocation in Provisioning of Virtual Machines", U.S. Appl. No. 12/202,178, filed Aug. 29, 2008.
DeHaan, "Methods and Systems for Providing Customized Actions Related to Software Provisioning", U.S. Appl. No. 12/200,552, filed Aug. 28, 2008.
DeHaan, "Methods and Systems for Automatically Locating a Provisioning Server", U.S. Appl. No. 12/198,290, filed Aug. 26, 2008.
DeHaan, "Methods and Systems for Managing Access in a Software Provisioning Environment", U.S. Appl. No. 12/201,832, filed Aug. 29, 2008.
DeHaan, "Methods and Systems for Importing Software Distributions in a Software Provisioning Environment", U.S. Appl. No. 12/200,631, filed Aug. 28, 2008.
DeHaan et al., "Methods and Systems for Managing Network Connections Associated with Provisioning Objects in a Software Provisioning Environment", U.S. Appl. No. 12/239,590, filed Sep. 26, 2008.
DeHaan, "Methods and Systems far Monitoring Software Provisioning", U.S. Appl. No. 12/198,378, filed Aug. 26, 2008.
DeHaan, "Systems and Methods for Software Provisioning in Multiple Network Configuration Environment", U.S. Appl. No. 12/202,194, filed Aug. 29, 2008.
DeHaan, "Systems and Methods for Differential Software Provisioning on Virtual Machines Having Different Configurations", U.S. Appl. No. 12/202,019, filed Aug. 29, 2008.
Del-lean, "Methods and Systems for Automatically Registering New Machines in a Software Provisioning Environment", U.S. Appl. No. 12/194,754, filed Aug. 20, 2008.
DeHaan, "Systems and Methods for Software Provisioning Machines Having Virtual Storage Resources", U.S. Appl. No. 12/202,189, filed Aug. 29, 2008.
DeHaan et al., "Methods and Systems for Managing Network Connections in a Software Provisioning Environment", U.S. Appl. No. 12/239,681, filed Sep. 26, 2008.
DeHaan et al., "Methods and Systems for Providing a Rescue Environment in a Software Provisioning Environment", U.S. Appl. No. 12/325,007, filed Nov. 28, 2008.
DeHaan et al., "Systems and Methods for Monitoring Hardware Resource in a Software Provisioning Environment", U.S. Appl. No. 12/325,056, filed Nov. 28, 2008.
DeHaan, "Methods and Systems for Providing Power Management Services in a Software Provisioning Environment", U.S. Appl. No. 12/277,518, filed Nov. 25, 2008.
DeHaan et al., "Methods and Systems for Providing Hardware Updates in a Software Provisioning Environment", U.S. Appl. No. 12/324,991, filed Nov. 28, 2008.
DeHaan et al., "Methods and Systems for Supporting Multiple Name Servers in a Software Provisioning Environment", U.S. Appl. No. 12/324,572, filed Nov. 26, 2008.
DeHaan et al., "Methods and Systems for Secure Gated File Deployment Associated with Provisioning", U.S. Appl. No. 12/393,754, filed Feb. 26, 2009.
DeHaan, "Systems and Methods for Integrating Software Provisioning and Configuration Management", U.S. Appl. No. 12/395,379, filed Feb. 27, 2009.
DeHaan, Systems and Methods for Abstracting Software Content Management in a Software Provisioning Environment, U.S. Appl. No. 12/395,273, filed Feb. 27, 2009.
DeHaan et al., "Systems and Methods for Providing a Library of Virtual Images in a Software Provisioning Environment", U.S. Appl. No. 12/395,351, filed Feb. 27, 2009.
DeHaan et al., "Systems and Methods for Inventorying Un-Provisioned Systems in a Software Provisioning Environment", U.S. Appl. No. 12/391,588, filed Feb. 24, 2009.
DeHaan et al., "Systems and Methods for Managing Configurations of Storage Devices in a Software Provisioning Environment", U.S. Appl. No. 12/393,613, filed Feb. 26, 2009.
DeHaan et al., "Methods and Systems for Replicating Provisioning Servers in a Software Provisioning Environment", U.S. Appl. No. 12/392,508, filed Feb. 25, 2009.
DeHaan, "Systems and Methods for Cloning Target Machines in a Software Provisioning Environment", U.S. Appl. No. 12/473,014, filed May 27, 2009.
DeHaan, "Methods and Systems for Provisioning Software", U.S. Appl. No. 11/763,315, filed Jun. 14, 2007.
DeHaan, "Methods and Systems for Provisioning Software", U.S. Appl. No. 11/763,333, filed Jun. 14, 2007.
DeHaan, "Systems and Methods for Message-Based Installation Management Using Message Bus", U.S. Appl. No. 12/495,077, filed Jun. 30, 2009.
Henson, "Systems and Methods for Integrating Storage Resources from Storage Area Network in Machine Provisioning Platform", U.S. Appl. No. 12/628,041, filed Nov. 30, 2009.
Henson, "Systems and Methods for Mounting Specified Storage Resources from Storage Area Network in Machine Provisioning Platform", U.S. Appl. No. 12/627,988, filed Nov. 30, 2009.
Doc Searls "Linux for Suits", 2005, Specialized System Consultants Inc., vol. 2005.
eBook "Microsoft System Management Server 2003 Administrator's companion", Microsoft Press, c2004, Ch. 13, Patch Management, pp. 471-507.
Butt et al., "Automated Installation of Large-Scale Linux Networks", 2000.
Agarwalla, "Automating Provisioning of Complete Software Stack in a Grid Environment", 2004.
Anderson et al., "Technologies for Large-Scale Configuration Management", Dec. 9, 2002.
Grosse, "Repository Mirroring", 1995.
HP Storage Essentials SRM 6.0 Installation Guide. Jan. 2008. HP. 1st ed. Part No. T4283-96113. pp. 1-5, 97-136, 219-228.
HP Storage Essentials SRM 6.0 User Guide. Jan. 2008. HP. 1st ed. Part No. T4238-96114. pp. 1-83.
Michael DeHaan. "Unified Provisioning". 2007.
Michael DeHaan. "Provisioning With Cobbler". 2007.
Tan et al. "A WBEM Basked Disk Array Management Provider". 2005. IEEE. 2005 International Conference on Cyberworlds.
Lovelace et al. Managing Disk Subsystems using IBM TotalStorage Productivity Center. Sep. 2005. IBM, 2nd ed. SG24-7097-01, pp. 1-42.

\* cited by examiner

COLLECTING AND ALTERING FIRMWARE CONFIGURATIONS OF TARGET MACHINES IN A SOFTWARE PROVISIONING ENVIRONMENT

FIELD

This invention relates generally to software provisioning. In particular, the invention relates to systems and methods for managing firmware in a software provisioning environment.

DESCRIPTION OF THE RELATED ART

Software provisioning is the process of selecting a target machine, such as a server, loading the appropriate software (operating system, device drivers, middleware, and applications), and customizing and configuring the system and the software to make it ready for operation. Software provisioning can entail a variety of tasks, such as creating or changing a boot image, specifying parameters, e.g. IP address, IP gateway, to find associated network and storage resources, and then starting the machine and its newly-loaded software. Typically, a system administrator will perform these tasks using various tools because of the complexity of these tasks. Unfortunately, there is a lack of provisioning control tools that can adequately integrate and automate these tasks.

Often, large entities, such as corporations, businesses, and universities, maintain large networks that include numerous systems spread over a wide geographic area. Often, these systems are provided by a variety of different vendors and include a variety of hardware and hardware configurations. Typically, each vendor provides various tools to manage the hardware of the systems they manufacture and these tools are often not cross-compatible. To manage these systems, the administrator of the network must utilize each vendor's tools separately in order to interact with the different systems.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments of the present teachings relate to systems and methods for managing firmware configurations of target machines in a software provisioning environment. More particularly, a provisioning server can utilize a firmware tool on target machines in order to collect firmware configuration data from and apply configuration data to the target machines, regardless of a type of the target machines.

According to embodiments, a provisioning server can be configured to provide and to interact with a firmware tool on target machines. The firmware tool can be configured to operate on different types of target machines independent of the type of the target machines. The firmware tool can be configured to communicate with the firmware of the target machines and collect data representing the configuration of the firmware of the target machines.

According to embodiments, to communicate independent of the type of target machine, the firmware tool can be configured to include a translation library. The translation library enables the firmware tool to receive common instructions for interacting with firmware and convert those common instructions into specific instructions that are compatible with different types of the target machines. As such, the firmware tool can be configured to operate and execute on any target machine regardless of the type of the target machines.

According to embodiments, to provide the firmware tool, the provisioning server can be configured to instruct a network management server to provide a command to a helper client on the target machines. The command can be configured to cause the helper client to retrieve the firmware tool from the provisioning server. Additionally, the provisioning server can be configured to instruct the helper client, directly. Likewise, the provisioning server can be configured to transmit the firmware tool to the target machines and to instruct the target machines to alter their power state (e.g. power cycle), if necessary, to initiate the firmware tool.

According to embodiments, the provisioning server can be configured to interact with the firmware tool, directly, to instruct the firmware tool and to collect the data from the firmware tool. Likewise, the provisioning server can be configured to operate in conjunction with the network management server in order to instruct the firmware tool and to collect data from the firmware tool. Once data is collected, the provisioning server can be configured to store the collected data in a firmware record.

According to embodiments, the provisioning sever can be configured to maintain the firmware record in order to track and manage the firmware configurations of the target machines in the software provisioning environment. For example, the provisioning server can be configured to utilize the collected data in the firmware record to check the target machines to see if the firmware configuration data is correct. If incorrect in a particular target machine, the provisioning server can be configured to provide the firmware tool to the particular target machine and configured to instruct the firmware tool to apply the stored firmware configuration data to the particular target machine.

By providing a firmware tool from a provisioning server, the provisioning server can manage the firmware configurations of the target machines in the software provisioning environment. Additionally, because the firmware tool is universally compatible with different types of target machines, the provisioning server can manage the firmware configuration of a wide variety of target machines without utilizing separate tools and protocols for each different type of target machine.

Figure 1:
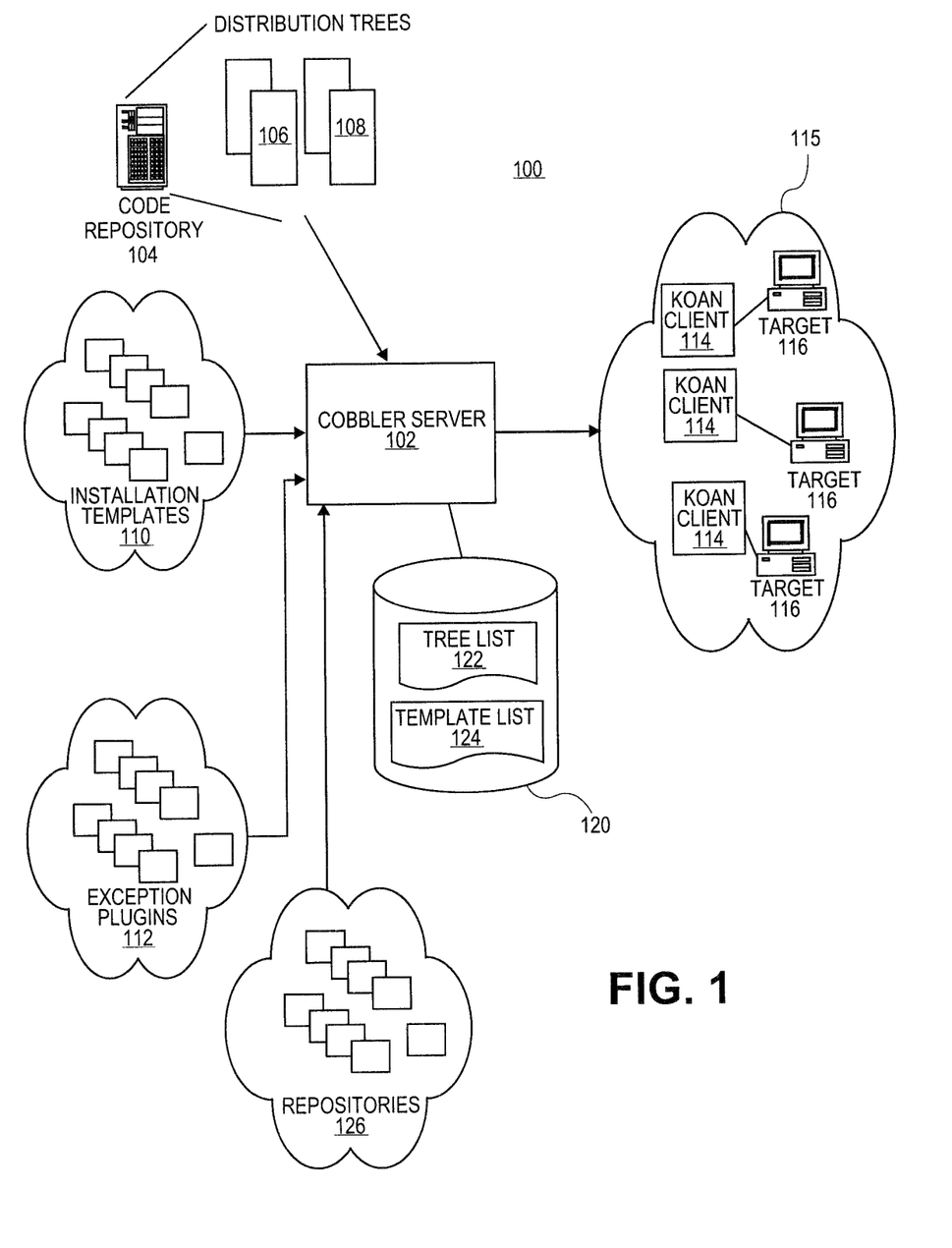
FIG. 1 illustrates an overall provisioning environment in which various embodiments of the present teachings can be practiced.

FIG. 1 illustrates an overall provisioning environment 100, in systems and methods for the execution, management, and monitoring of software provisioning, according to exemplary aspects of the present disclosure. Embodiments described herein can be implemented in or supported by the exemplary environment illustrated in FIG. 1. The provisioning environment 100 provides a unified provisioning environment, which comprehensively manages the tasks related to software provisioning.

In particular, the provisioning environment 100 can manage software provisioning using a hierarchy of commands. In exemplary embodiments, the hierarchy can include at least four levels of commands. The lowest level in the hierarchy can comprise distribution commands, which primarily handle base operating system specific tasks of provisioning. The second level can comprise profile commands, which associate a configuration file, such as a kickstart file for Linux or other operating system, with a distribution and optionally allow for customization. The third level comprises system commands, which associate remote systems that are involved with the provisioning of the software. The fourth level comprises repository commands, which address configurations and tasks related to updating the software, remote installation procedures, and optionally customizing the software.

The provisioning environment 100 provides several capabilities and advantages over the known provisioning solutions. For example, the present invention is capable of handling a variety of forms of installations, such as preboot execution environment ("PXE"), virtualization, re-installations, and image installations.

In exemplary aspects, the provisioning environment 100 enables integrating virtualization into a PXE provisioning infrastructure and provides several options to reinstall running machines as well. The provisioning environment 100 can integrate mirroring of package repositories with the provisioning process, so that a provisioning server may serve as a central mirror point of contact for all of an organizations software needs. In aspects, a set of remote mirrored repositories can automatically be used by provisioned systems without additional setup.

Reference will now be made in detail to the exemplary aspects the provisioning environment 100. The provisioning environment 100 can be applied to provisioning any form of software, such as Windows systems, UNIX systems, and Linux systems. In the exemplary description that follows, FIG. 1 is presented to explain the provisioning environment 100 for provisioning software, such as Linux, and Linux based software, such as Fedora and Red Hat Enterprise Linux by Red Hat, Inc.

In provisioning of software such as Linux, many system administrators use what is known as the "kickstart" installation method. Kickstart files are files that specify the intended configuration of the software being provisioned. Kickstart files can be kept on a server and can be read by individual computers during the installation. This installation method allows the use of a single or relatively few standard kickstart files to install Linux on multiple machines, making it ideal for network and system administrators.

The kickstart file can be a simple text file, containing a list of items, each identified by a keyword. In general, a kickstart file can be edited with any text editor or word processor that can save files as ASCII text. One skilled in the art will recognize that the present invention may be applied to non-kickstart files in software provisioning. For example, configuration files such as AutoYAST Answer files used in Novell SuSe Linux and Sun Solaris Jumpstart files may also be used by the provisioning environment 100.

Typically, a kickstart file can be copied to the boot disk, or made available on the network. The network-based approach is most commonly used, as most kickstart installations for software provisioning, such as Linux systems, tend to be performed via a network using NFS, FTP, or HTTP on networked computers. Administrators also find it desirable that kickstart installations can be performed using a local CD-ROM, or a local hard drive.

Using kickstart files, a system administrator can create a single file containing the parameters that are needed to complete a typical software installation. For example, kickstart files specify parameters related to: language selection; mouse configuration; keyboard selection; boot loader installation; disk partitioning; network configuration; NIS, LDAP, Kerberos, Hesiod, and Samba authentication; firewall configuration; and package selection.

According to exemplary aspects illustrated in FIG. 1, the provisioning environment 100 can include a provisioning server 102, a code repository 104 which provides access to distributions 106 and 108, a set of installation templates 110, a set of exception plugins 112, a helper client 114 running on target machines 116 in a network 115, a provisioning database 120 which comprises a distribution tree list 122 and template list 124. Each of these components will now be further described.

The provisioning server (from herein referred to as a "cobbler") 102 is responsible for: serving as an extensible markup language remote procedure call (XMLRPC) handler; linking to or mirroring install distribution trees and a configuration database; hosting kickstart templates; hosting plugins; generating installation images, and the like. The cobbler server 102 can be implemented as software, such as Python code, installed on a boot server machine and provide a command line interface for configuration of the boot server. In addition, the cobbler server 102 can make itself available as a Python application programming interface (API) for use by higher level management software (not shown). The cobbler server 102 supports provisioning via PXE, image (ISO) installation, virtualization, re-provisioning. As will be described later, the last two modes are performed with the assistance of a helper client 114.

The code repository 104 is responsible for hosting distributions 106 and 108. The code repository 104 can be implemented using well known components of hardware and software. Additionally, the code repository 104 can include one or more repositories hosting distributions. The distributions 106 and 108 can include bundles of software that are already compiled and configured. The distributions 106 and 108 may be in the form of either rpm, deb, tgz, msi, exe formats, and the like. For example, as Linux distributions, the distributions 106 and 108 are bundles of software that comprise the Linux kernel, the non-kernel parts of the operating system, and assorted other software. The distributions 106 and 108 can take a variety of forms, from fully-featured desktop and server operating systems to minimal environments.

In exemplary aspects, the installation templates 110 are any data structure or processing element that can be combined with a set of installation configurations and processed to produce a resulting configuration file, such as a kickstart file.

In exemplary aspects, exception plugins 112 are software that interact with cobbler server 102 to customize the provisioning of software. In general, the exception plugins 112 are intended to address infrequent customization needs.

In exemplary aspects, the helper client (known as "koan", which stands for "kickstart-over-a-network") 114 can assist the cobbler server 102 during the provisioning processes. The koan 114 can allow for both network provisioning of new virtualized guests and destructive provisioning of any existing system. When invoked, the koan 114 can request profile information from a remote boot server that has been configured with the cobbler server 102. In some aspects, what the koan 114 does with the profile data depends on whether it was invoked with -virt or -replace-self.

In exemplary aspects, the koan 114 can enable replacing running systems as well as installing virtualized profiles. The koan 114 can also be pushed out to systems automatically from the boot server. In some aspects, the koan client 114 is also written in Python code to accommodate a variety of operating systems, machine architectures, etc.

In exemplary aspects, the network 115 can include a number of the target machines 116. The target machines 116 can represent the particular machines to which software provisioning is directed. The target machines 116 can represent a wide variety of computing devices, such as personal computers, servers, laptop computers, personal mobile devices, and the like. In some aspects, the target machines 116 can represent distributed computing environments such as cloud computing environments. Although FIG. 1 shows several of the target machines 116, the provisioning environment 100 can be capable of managing a wide range environments, such as datacenters with thousands of machines or server pools with just a few machines. Additionally, the cobbler server 102 can be connected to multiple networks 115.

In exemplary aspects, the provisioning database 120 can serve as a data storage location for holding data used by the cobbler server 102. For example, as shown, the provisioning database 120 can comprise the distribution tree list 122 and the template list 124. The distribution tree list 122 can provide an inventory of the distributions 106 and 108 that are hosted or mirrored by the cobbler server 102. The template list 124 can provide an inventory of the templates 110 that are hosted by the cobbler server 102.

As noted above, the cobbler server 102 can manage provisioning using a hierarchical concept of distribution commands, profile commands, system commands, and repository commands. This framework enables the cobbler server 102 to abstract the differences between multiple provisioning types (installation, reinstallation, and virtualization) and allows installation of all three from a common platform. This hierarchy of commands also permits the cobbler server 102 to integrate software repositories 126 with the provisioning process, thus allowing systems to be configured as a mirror for software updates and third party content as well as distribution content.

Distributions can contain information about base operating system tasks, such as what kernel and initial ramdisk ("initrd") are used in the provisioning, along with other information, such as required kernel parameters. Profiles associate one of the distributions 106 and 108 with a kickstart file and optionally customize it further, for example, using plugins 112. System commands associate a hostname, IP, or (machine access control) MAC with a distribution and optionally customize the profile further. Repositories contain update information, such as yum mirror information that the cobbler server 102 uses to mirror repository 104. The cobbler server 102 can also manage (generate) dynamic host configuration protocol (DHCP) configuration files using the templates 110.

In exemplary aspects, the cobbler server 102 can use a provisioning environment that is fully templated, allowing for kickstarts and PXE files to be customized by the user. The cobbler server 102 uses the concept of "profiles" as an intermediate step between the operating system and the installed system. A profile is a description of what a system does rather than the software to be installed. For instance, a profile might describe a virtal web server with X amount of RAM, Y amounts of disk space, running a Linux distribution Z, and with an answer file W.

In exemplary aspects, the cobbler server 102 can provide a command line interface to configure a boot server in which it is installed. For example, the format of the cobbler server 102 commands can be generally in the format of: cobbler command [subcomrnmand] [--arg1=] [--arg2=]. Thus, a user can specify various aspects of software provisioning via a single interface, such as a command line interface or other known interface. Examples of exemplary cobbler commands can be found in U.S. patent application Ser. No. 11/763,315, U.S. Patent Application Publication No. 2008-0288938 and U.S. patent application Ser. No. 11/763,333, U.S. Patent Publication No. 2008-0288939, all assigned to Red Hat Corporation, the disclosures of which are incorporated herein, in their entirety, by reference.

According to exemplary aspects, a user can use various commands of the provisioning environment 100 to specify distributions and install trees hosted by the code repository 104, such as a distribution from the distributions 106 or 108. A user can add or import a distribution or import it from installation media or an external network location.

According to exemplary aspects, in order to import a distribution, the cobbler server 102 can auto-add distributions and profiles from remote sources, whether this is an installation media (such as a DVD), an NFS path, or an rsync mirror. When importing an rsync mirror, the cobbler server 102 can try to detect the distribution type and automatically assign kickstarts. By default in some embodiments, the cobbler server can provision by erasing the hard drive, setting up eth0 for DHCP, and using a default password. If this is undesirable, an administrator may edit the kickstart files in /etc/cobbler to do something else or change the kickstart setting after the cobbler server 102 creates the profile.

According to exemplary aspects, a user may map profiles to the distributions and map systems to the profiles using profile commands and systems commands of the provisioning environment 100. A profile associates a distribution to additional specialized options, such as a kickstart automation file. In the cobbler server 102, profiles are the unit of provisioning and at least one profile exists for every distribution to be provisioned. A profile might represent, for instance, a web server or desktop configuration.

According to exemplary aspects, a user can map systems to profiles using system commands. System commands can assign a piece of hardware with cobbler server 102 to a profile. Systems can be defined by hostname, Internet Protocol (IP) address, or machine access control (MAC) address. When available, use of the MAC address to assign systems can be preferred.

According to exemplary aspects, the user can map repositories and profiles using repository commands. Repository commands can address configurations and tasks related to updating the software, remote installation procedures, and optionally customizing the software. These repository commands can also specify mirroring of the provisioned software to remote servers. Repository mirroring can allow the cobbler server 102 to mirror not only the trees 106 and 108, but also optional packages, third party content, and updates. Mirroring can be useful for faster, more up-to-date installations and faster updates, or providing software on restricted networks. The cobbler server 102 can also include other administrative features, such as allowing the user to view their provisioning configuration or information tracking the status of a requested software installation.

According to exemplary aspects, a user can utilize commands to create a provisioning infrastructure from a distribution mirror. Then a default PXE configuration is created, so that by default, systems will PXE boot into a fully automated install process for that distribution. The distribution mirror can be a network rsync mirror or a mounted DVD location.

According to exemplary aspects, the administrator uses a local kernel and initrd file (already downloaded), and shows how profiles would be created using two different kickstarts—one for a web server configuration and one for a database server. Then, a machine can be assigned to each profile.

According to exemplary aspects, a repo mirror can be set up for two repositories, and create a profile that will auto install those repository configurations on provisioned systems using that profile.

According to exemplary aspects, in addition to normal provisioning, the cobbler server 102 can support yet another option, called "enchant". Enchant takes a configuration that has already been defined and applies it to a remote system that might not have the remote helper program installed. Users can use this command to replace a server that is being repurposed, or when no PXE environment can be created. Thus, the enchant option allows the remote the koan client 114 to be executed remotely from the cobbler server 102.

According to aspects, if the cobbler server 102 is configured to mirror certain repositories, the cobbler server 102 can then be used to associate profiles with those repositories. Systems installed under those profiles can be auto configured to use these repository mirrors in commands and, if supported, these repositories can be leveraged. This can be useful for a large install base, when fast installation and upgrades for systems are desired, or software not in a standard repository exists and provisioned systems desire to know about that repository.

According to exemplary aspects, the cobbler server 102 can also keep track of the status of kickstarting machines. For example, the "cobbler status" will show when the cobbler server 102 thinks a machine started kickstarting and when it last requested a file. This can be a desirable way to track machines that may have gone inactive during kickstarts. The cobbler server 102 can also make a special request in the post section of the kickstart to signal when a machine is finished kickstarting.

According to exemplary aspects, for certain commands, the cobbler server 102 will create new virtualized guests on a machine in accordance with orders from the cobbler server 102. Once finished, an administrator can use additional commands on the guest or other operations. The cobbler server 102 can automatically name domains based on their MAC addresses. For re-kickstarting, the cobbler server 102 can reprovision the system, deleting any current data and replacing it with the results of a network install.

According to exemplary aspects, the cobbler server 102 can configure boot methods for the provisioning requested by the user. For example, the cobbler server 102 can configure a PXE environment, such as a network card BIOS. Alternatively, the cobbler server 102 can compile and configure information for koan client 104. The cobbler server 102 can also optionally configure DHCP and DNS configuration information.

According to exemplary aspects, the cobbler server 102 can serve the request of the koan client 114. The koan client 114 can acknowledge the service of information of the cobbler server 102 and can then initiate installation of the software being provisioned. Additionally, the koan client 114 can either install the requested software, e.g., replace the existing operating system, or install a virtual machine.

Figure 2:
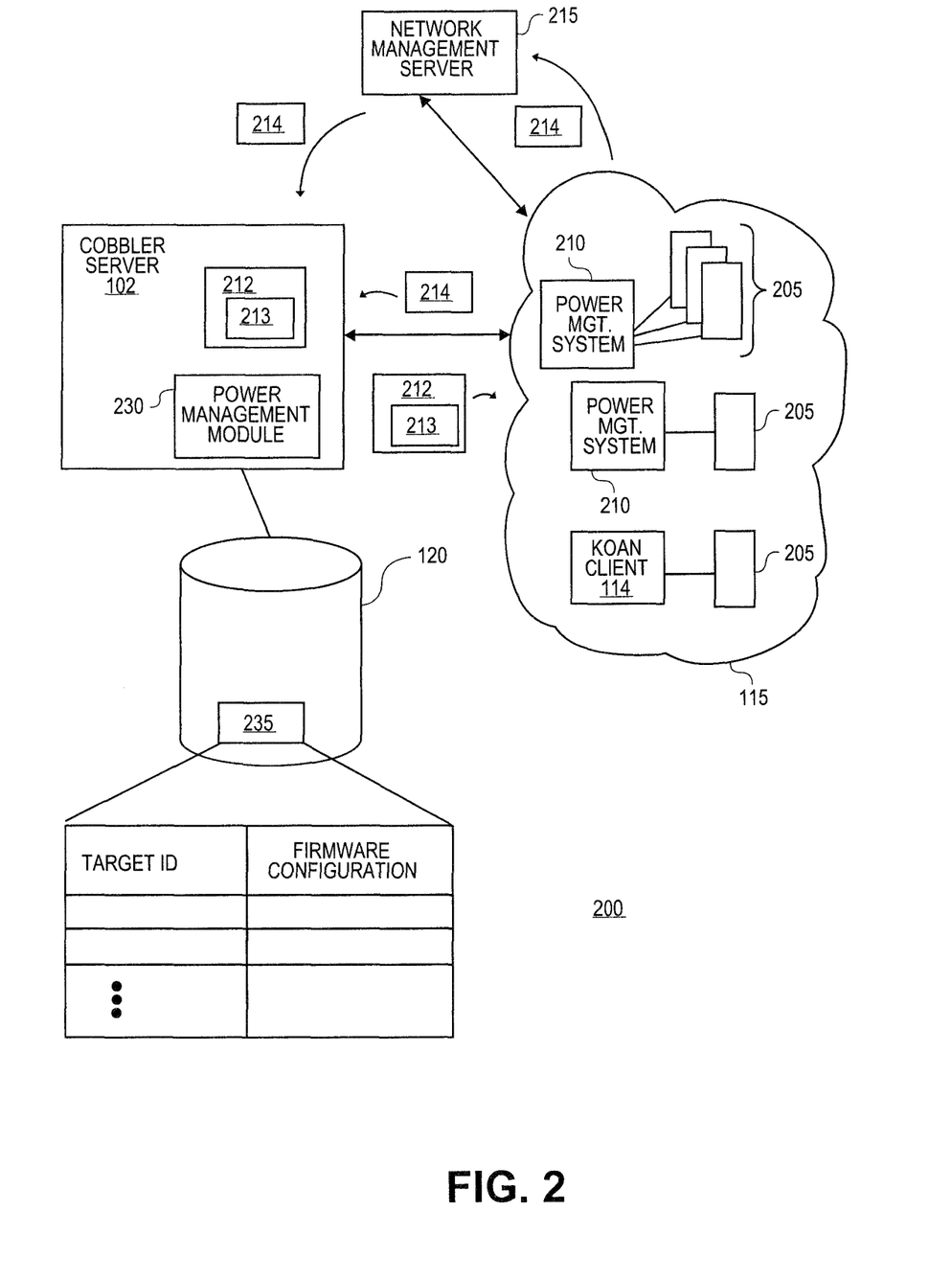
FIG. 2 illustrates the overall provisioning environment in which a provisioning server can manage firmware configurations of target machines, according to various embodiments.

FIG. 2 illustrates aspects of the provisioning environment 200 that allows management of firmware of target machines, remotely. In embodiments as shown, the cobbler server 102 can be coupled to a network 115 and a network management server 215 to provide provisioning processes and other actions related to provisioning for the network 115. While FIG. 2 illustrates one network 115 with exemplary components, one skilled in the art will realize that the cobbler server 102 can be coupled to multiple networks to provide provisioning processes and other actions related to provisioning.

As shown in FIG. 2, the network 115 can include a number of target machines 205. For example, the target machines 205 can include a group of server computers, such as blade servers. The target machines 205 can include computing systems such as servers, personal computers, laptop computers, etc. The target machines 205 can be connected to power management systems 210 to control the power supplied to the target machines 205 and to alter the power state of one or more of the target machines 205 (e.g. power cycle). The power management systems 210 can be any type of system to manage the power of the target machines, for example, Integrated Lights Out (ILO) by Hewlett Packard™ Corporation, Dell™ Remote Access Control (DRAC) by Dell Corporation, WTI powerbar by Western Telematies, Inc, and other power system supporting network communications. Additionally, each of the target machines 205 can be configured to include a koan client 114.

In embodiments, the target machines 205 can include hardware typically found in conventional computing system (processors, memory, video cards, network interface cards, storage devices, and the like). As such, the target machines 205 can include firmware on each of the target machines 205, such as a basic input/output system (BIOS). The firmware contains basic code that executes once the target machines 205 begin running and each time the target machines 205 restart. The firmware can be responsible for identifying, testing, and initializing the hardware of the target machines, prior to other software (e.g. OS) taking control. The firmware can also include configuration data that is utilized in initializing the hardware.

In embodiments, the target machines 205, in the network 115, can be different types of computing systems. For example, the various target machines 205 can be manufactured or constructed by different vendors, for example, Dell Corporation, IBM Corporation, Hewlett Packard Corporation, and the like. Typically, each vendor can utilize a different firmware for the target machines 205, which they manufacture. As such, the firmware for the target machines 205 can differ and can utilize specific instructions for communicating with the firmware and a specific format of the firmware configuration data, based on the vendor of the target machines 205.

In embodiments, the cobbler server 102 can be configured to manage the firmware of the target machines 205, regardless of the type of the target machines 205. For example, the target machines 205 can include different types of firmware based on the particular vendor of the target machines 205. To achieve this, the cobbler server 102 can be configured to provide a firmware tool 212 to one or more of the target machines 205 and to interact with the firmware tool 212 in order to manage the firmware of the target machines 205.

In embodiments, the firmware tool 212 can be configured to operate on the target machines 205 independent of the particular firmware of the target machines 205. To achieve this, the firmware tool 212 can be configured to include a translation library 213. The translation library 213 can include lists of the specific instructions to communicate with the different firmware and a conversion table to convert common instructions into the specific instructions for communicating with the different firmware. The conversion table can map a particular common instruction to a particular specific instruction in the particular list associated with a particular type of the firmware. The translation library 235 enables the firmware tool to receive the common instructions for interacting with firmware and convert those common instructions into the specific instructions that are compatible with the different types of firmware. Additionally, the translation library 235 can include a list of the formats for the configuration data of the different firmware and a conversion table for converting the different configuration data formats into a common configuration data format. As such, the firmware tool 21 can be configured to operate and execute on any target machine 205 regardless of the type of the target machines 205 and the firmware on the target machines 205.

In embodiment, the firmware tool 212 can also be configured to include the necessary logic, routines, instruction, and commands to boot the target machines 205 or to cooperated with the OS of the target machines 205 in order to identify the type of the target machine 205, to communicate with the firmware of the target machines 205, and to manage the firmware of the target machines. The firmware tool 212 can be, for example, a disk image, an ISO image, a software appliance (e.g. portions of an OS and applications), or any other type of tailored software application capable of executing on the target machines 205.

In embodiments, the cobbler server 102 can be configured to utilize the firmware tool 212 to perform any number of management processes on the firmware of the target machines 205. The cobbler server 102 can be configured to utilize the firmware tool 212 to collect firmware configuration data 214, alter the firmware configuration data, and the like.

In embodiments, the cobbler server 102 can initiate providing the firmware tool 212 upon the occurrence of any number of events. For example, the cobbler server 102 can provide the firmware tool 212 when a target machine 205 is added to the network 115 or new hardware is added to a target machine 205. Likewise, the cobbler server 102 can provide the firmware tool 212, periodically, to the target machines 205 to test the firmware of the target machines 205. Additionally, the cobbler server 102 can be configured to provide the firmware tool 212 in the event an error occurs on the target machines 205 (hardware/software failure, intruder attack on the target machines 205, etc.).

In embodiments, the cobbler server 102 can be configured to maintain the firmware tool 212 for access and utilization in managing the firmware of the target machines 205. For example, the cobbler server 102 can be configured maintain the firmware tool 212 in a non-transitory storage device or system (CD, DVD, hard drive, portable storage memory, database etc.) whether local to the cobbler server 102 or remotely located. Additionally, the cobbler server 102 can maintain the firmware tool 212 or information specifying the location of the firmware tool 212 in the provisioning database 120.

In embodiments, to provide the firmware tool 212, the cobbler server 102 can be configured to provide the firmware tool 212 utilizing the network management server 215. The cobbler server 102 can be configured to instruct the network management server 215 to provide a command to the koan client 114 on the target machines 205. The command can be configured to cause the koan client 114 to retrieve the firmware tool 212 from the cobbler server 102 and initiate the firmware tool 212 on the target machines 205. Likewise, the cobbler server 102 can be configured to directly instruct the koan client 114 to retrieve the firmware tool 212 and to initiate the firmware tool 212.

In embodiments, the network management server 215 can be any type of network management application or tool to securely communicate with the target machines 205, to monitor the state of the target machines 205, to retrieve and request data from the target machines 205, and to manage and direct the target machines 205. For example, the network management server 215 can be a "FUNC" server as described in U.S. patent application Ser. No. 12/130,424, filed May 30, 2008, entitled "SYSTEMS AND METHODS FOR REMOTE MANAGEMENT OF NETWORKED SYSTEMS USING SECURE MODULAR PLATFORM" (U.S. Patent Application Publication No. 20090300180) assigned to Red Hat Corporation, the disclosure of which is incorporated herein, in its entirety, by reference.

In embodiments, the cobbler server 102 can be configured to provide the firmware tool 212 to the target machines 205, directly. To achieve this, the cobbler server 102 can be configured to transmit the firmware tool 212 to the target machines 205.

In embodiments, once the firmware tool 212 is transmitted, the cobbler server 102 can be configured to instruct the target machines 205 to alter their power state (e.g. power cycle) to initiate the firmware tool 212, if necessary. For example, in order to communicate with the firmware, the target machines 205 may need to be power cycled. The cobbler server 102 can power cycle (power down/power up) the target machines 205 in order to initiate the firmware tool 212 or restart the target machines 205 after the firmware tool 212 has completed management. The cobbler server 102 can be configured to communicate with the power management system 210 of the target machines 205 to alter the power state of the target machines 205. To achieve this, the cobbler server 102 can be configured to include a power management module 230.

In embodiments, the power management module 230 can be configured to communicate with the power management systems 210 of the target machines 205. The power management module 230 can be configured to instruct the power management systems 210 to alter the power state of the target machines 205. The power management module 230 can be configured to generate a command or instruction. The instruction can include access information for the power management systems 210 and the power state alteration to be performed.

In embodiments, the power management module 230 can be configured to form the instruction in a protocol utilized by the particular power management systems 210. For example, the cobbler server 102 can be configured to utilize conventional or proprietary protocols or tools such as IPMI, DRAC, ILO, fence agents and the like. The power management module 230 can be configured to utilize a pre-determined protocol or utilize several protocols in order to determine the appropriate protocol. Once generated, the cobbler server 102 can be configured to transmit the instruction to the determined power management systems 210.

In embodiments, the power management module 230 can be implemented as a portion of the code for the cobbler server 102. Likewise, the power management module 230 can be implemented as a separate software tool accessible by the cobbler server 102. Additionally, the power management module 230 can be implemented as a portion of the code for the network management server 215. The power management module 230 can be written in a variety of programming languages, such as JAVA, C++, Python code, and the like to accommodate a variety of operating systems, machine architectures, etc. Additionally, the power management module 230 can be configured to include the appropriate application programming interfaces (APIs) to communicate with and cooperate with other components of the cobbler server 102.

In embodiments, once the firmware tool 212 has been initiated, the cobbler server 102 can be configured to interact with the firmware tool 212, directly, to instruct the firmware tool 212 and to collect the configuration data 214 from the firmware tool 212. Likewise, the cobbler server 102 can be configured to operate in conjunction with the network management server 215 in order to instruct the firmware tool 212 and to collect configuration data 214 from the firmware tool 212. The cobbler server 102 can be configured to instruct the network management server 215 to interact with the firmware tool 212 and to collect the configuration data 214. Once collected, the cobbler server 102 can be configured to receive the configuration data 214 from the network management server 215.

In embodiments, the firmware tool 212 can be configured to utilize the translation library 213 in order to provide the configuration data 214 in a common format. For example, once the firmware tool 212 acquires the configuration data form particular firmware, the firmware tool 212 can apply the appropriate conversion for the particular firmware, from the translation library 213, in order to produce the configuration data 214 in the common format.

In embodiments, once data is collected, the cobbler server 102 can be configured to store the configuration data 214 in a firmware record 235. The firmware record 235 can be configured to categorize the configuration data 214 according to the data that uniquely identifies the target machines 205 in the network 115 such as Media Access Control ("MAC") address, Ethernet Hardware Address ("EHA"), and the like. The firmware record 235 can be configured to associate the configuration data 214 of the target machines 205 with the data that uniquely identifies the target machines 205. The cobbler server 102 can be configured to maintain the firmware record 235 in the provisioning database 120, or any other local or remote storage system.

In embodiments, once the cobbler server 102 has received the configuration data 214 and stored the configuration data 214 in the firmware record 235, the cobbler server 102 can be configured to perform other firmware management processes on the target machines 205. For example, the cobbler server 102 can be configured to utilize the configuration data 214 in the firmware record 235 to check the current configuration data of the target machines 205.

For instance, in one example, a particular target machine 205 can experience an error or other event such as an intruder attack. The cobbler server 102 can be configured to provide the firmware tool 212 to the particular target machine 205 and configured to instruct the firmware tool 212 to collect the current firmware configuration data, as described above. If the current firmware configuration data does not match the configuration data 214 stored in the firmware record 235, the cobbler server 102 can be configured to instruct the firmware tool 212 to apply the configuration data 214 stored in the firmware record 235 to the particular target machine 205. The firmware tool 212 can be configured to convert the configuration data 214, which is stored in the common format, into the specific format that corresponds to the firmware by utilizing the translation library 213. Likewise, the firmware tool 212 can be configured to utilize the translation library 213 to communicate with the firmware.

In embodiments, for further example, the cobbler server 102 can be configured to instruct the firmware tool 212 to perform other firmware management process such as altering the configuration data. For instance, whether directly or via the management server 215, the cobbler server 102 can be configured to provide the firmware tool 212 to a particular target machine 205 and configured to instruct the firmware tool 212 to alter a particular parameter in the configuration data. The cobbler server 102 can be configured to instruct the firmware tool 212 by providing a common instruction to alter the parameter and the desired alteration. Once received, the firmware tool 212 can be configured to convert the common instruction into a specific instruction for the type of the target machine 205 and provide the specific instruction to the target machine 205 in order to alter the parameter.

In embodiments as described above, the firmware record 235 can be generated and populated by the configuration data 214 received from the firmware tool 212. Likewise, the firmware record 235 can be generated and populated independently of the firmware tool 212. For example, an administrator or operator of the network 115 can generate and populate the records. Whether generated independently or by data from the firmware tool 212, the cobbler server 102 can be configured to provide the identification and the type of the target machines 205 to the firmware tool 212 during the management processes to facilitate identifying the target machines 205. Likewise, the firmware tool 212 can be configured to identify the type of target machine 205, independently, once initiated on the target machine 205.

Figure 3:
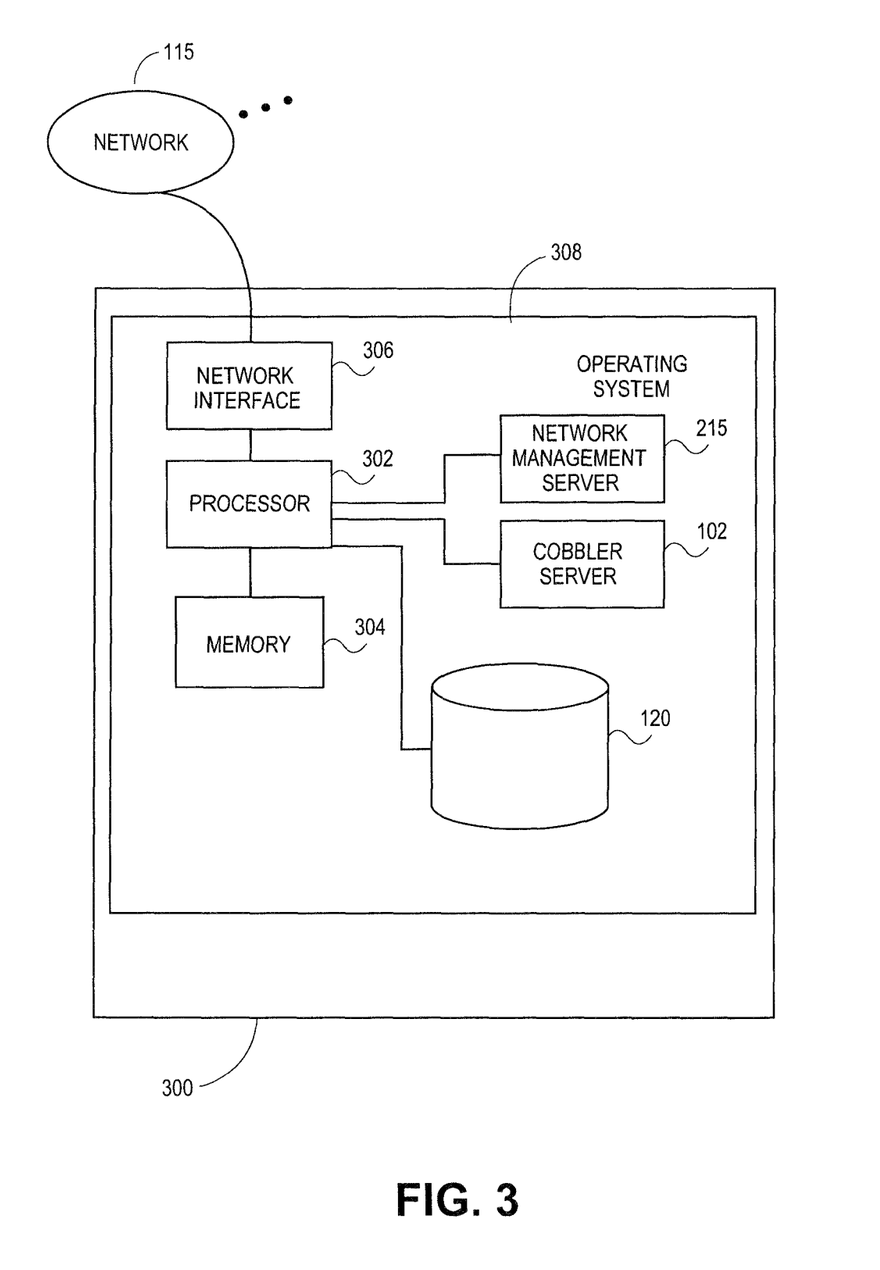
FIG. 3 illustrates an exemplary hardware configuration for a provisioning server, according to various embodiments.

FIG. 3 illustrates an exemplary diagram of hardware and other resources that can be incorporated in a computing system 300 configured to communicate with the network 115, and execute the cobbler server 102 and the network management server 215 according to embodiments. In embodiments as shown, the computing system 300 can comprise a processor 302 communicating with memory 304, such as electronic random access memory, operating under control of or in conjunction with operating system 308. Operating system 308 can be, for example, a distribution of the Linux™ operating system, the Unix™ operating system, or other open-source or proprietary operating system or platform. Processor 302 also communicates with the provisioning database 120, such as a database stored on a local hard drive. While illustrated as a local database in computing system 300, the provisioning database 120 can be separate from the computing system 300 and the cobbler server 102 can be configured to communicate with the remote provisioning database 120.

Processor 302 further communicates with network interface 306, such as an Ethernet or wireless data connection, which in turn communicates with one or more networks 115, such as the Internet or other public or private networks. Processor 302 also communicates with the provisioning database 120, the cobbler server 102, and the network management server 215, to execute control logic and perform the firmware management processes described above and below.

As illustrated, the cobbler server 102 can be implemented as a software application or program capable of being executed by a conventional computer platform. Likewise, the cobbler server 102 can also be implemented as a software module or program module capable of being incorporated in other software applications and programs. In either case, the cobbler server 102 can be implemented in any type of conventional proprietary or open-source computer language.

As illustrated, the network management server 215 can be executed in the computing system 300. Likewise, the network management server 215 can be executed in a separate computing system including components similar to computing system 300. Accordingly, the computing system 300 can communicate with the network management server 215 via the network interface 306.

Figure 4:
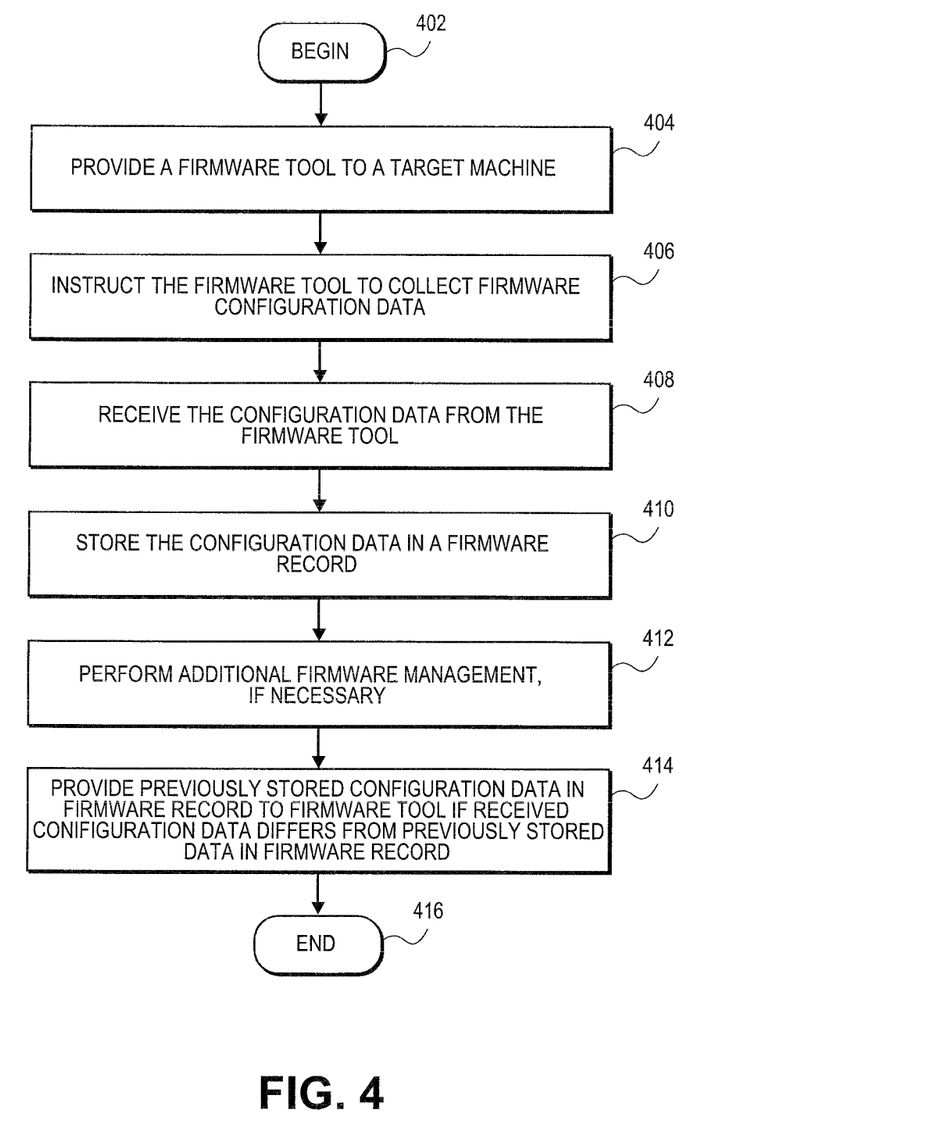
FIG. 4 illustrates a flowchart for managing firmware configurations of target machines, according to various embodiments.

FIG. 4 illustrates a flow diagram for firmware management in the provisioning environment 200, according to embodiments of the present teachings. In 402, the process can begin. In 404, the cobbler server 102 can provide a firmware tool 212 to a target machine 205. The cobbler server 102 can initiate providing the firmware tool 212 upon the occurrence of any number of events. For example, the cobbler server 102 can provide the firmware tool 212 when a target machine 205 is added to the network 115 or new hardware is added to a target machine 205. Likewise, the cobbler server 102 can provide the firmware tool 212, periodically, to the target machines 205 to test the firmware of the target machines 205. Additionally, the cobbler server 102 can provide the firmware tool 212 in the event an error occurs on the target machines 205 (hardware/software failure, intruder attack on the target machines 205, etc.).

In 406, the cobbler server 102 can instruct the firmware tool 212 to collect firmware configuration data from the target machine 205. For example, the cobbler server 102 can interact with the firmware tool 212, directly, to instruct the firmware tool 212 and to collect the configuration data 214 from the firmware tool 212. Likewise, the cobbler server 102 can operate in conjunction with the network management server 215 in order to instruct the firmware tool 212 and to collect configuration data 214 from the firmware tool 212. The cobbler server 102 can instruct the network management server 215 to interact with the firmware tool 212 and to collect the configuration data 214. Likewise, the cobbler server 102 or the network management server 215 can communicate with the power management system of the target machine 205 in order to power cycle the target machine to initiate the firmware tool 212.

The firmware tool 212 can utilize the translation library 213 to allow the cobbler server 102 to communicate with the firmware using common instructions and to provide the configuration data 214 in a common format. For example, once the firmware tool 212 acquires the configuration data form particular firmware, the firmware tool 212 can apply the appropriate conversion for the particular firmware, from the translation library 213, in order to produce the configuration data 214 in the common format.

In 408, the cobbler server 102 can receive the configuration data 214 from the firmware tool 212. For example, the cobbler server 102 can be receive the configuration data 214 directly or from the network management server 215.

In 410, the cobbler server 102 can store the configuration data 214 in a firmware record 235. For example, the firmware record 235 can categorize the configuration data 214 according to the data that uniquely identifies the target machines 205 in the network 115 such as Media Access Control ("MAC") address, Ethernet Hardware Address ("EHA"), and the like. The firmware record 235 can be associate the configuration data 214 of the target machines 205 with the data that uniquely identifies the target machines 205.

In 412, once the cobbler server 102 has received the configuration data 214 and stored the configuration data 214 in the firmware record 235, the cobbler server 102 can perform additional firmware management on the target machine 205. For example, the cobbler server 102 can utilize the configuration data 214 in the firmware record 235 to check the current configuration data of the target machines 205. In 414, the cobbler server 102 can provide the previously stored configuration data in firmware record 235 to the firmware tool 212 if the received configuration data 214 differs from the previously stored data in firmware record 235.

In 416, the process can end, but the process can return to any point and repeat.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
providing, by a processor, a firmware tool to a target machine for execution on the target machine, wherein the firmware tool locally collects data representing a configuration of firmware of the target machine and wherein the firmware tool collects the data independent of a type of the target machine by using a translation library of the firmware tool to receive common instructions to interact with the firmware and convert the common instructions into specific instructions for a particular type of the target machine; and
receiving, by the processor, the data from the firmware tool.

2. The method of claim 1, the method further comprising: storing the data in a firmware record.

3. The method of claim 1, further comprising:
comparing the data with previously stored data in a firmware record; and
providing the previously stored data to the firmware tool if the data differs from the previously stored data, the firmware tool to apply the previously stored data to the firmware of the target machine.

4. The method of claim 1, wherein receiving the data comprises:
instructing a network management server to collect the data from the firmware tool; and
receiving the data from the network management server.

5. The method of claim 1, wherein the firmware tool is contained within a disk image.

6. The method of claim 1, wherein providing the firmware tool further comprises:
instructing a helper client on the target machine to retrieve the firmware tool.

7. The method of claim 1, wherein providing the firmware tool comprises:
transmitting the firmware tool to the target machine over a network; and
sending instructions to alter a power state of the target machine after transmitting the firmware tool.

8. A system comprising:
a network interface to a network of target machines; and
a provisioning server, communicating with the network interface and a network management server, the provisioning server to:
provide a firmware tool to a target machine in the network for execution on the target machine, wherein the firmware tool locally collects data representing a configuration of firmware of the target machine and wherein the firmware tool collects the data independent of a type of the target machine by using a translation library included in the firmware tool to receive common instructions to interact with the firmware and convert the common instructions into specific instructions for a particular type of the target machine; and receive the data from the firmware tool.

9. The system of claim 8, the provisioning server to store the data in a firmware record.

10. The system of claim 8, the provisioning server to:
compare the data with previously stored data in a firmware record; and
provide the previously stored data to the firmware tool if the data differs from the previously stored data, the firmware tool to apply the previously stored data to the firmware of the target machine.

11. The system of claim 8, wherein receiving the data comprises:
instructing the network management server to collect the data from the firmware tool; and
receiving the data from the network management server.

12. The system of claim 8, wherein the firmware tool is contained in a disk image.

13. The system of claim 8, wherein providing the firmware tool comprises:
instructing a helper client on the target machine to retrieve the firmware tool.

14. The system of claim 8, wherein providing the firmware tool comprises:
transmitting the firmware tool to the target machine over the network; and
sending instructions to alter a power state of the target machine after transmitting the firmware tool.

15. A non-transitory computer readable storage medium storing instructions which, when executed by a processor, cause the processor to perform operations comprising:
providing, by the processor, a firmware tool to a target machine for execution on the target machine, wherein the firmware tool locally collects data representing a configuration of firmware of the target machine and wherein the firmware tool collects the data independent of a type of the target machine by using a translation library included in the firmware tool to receive common instructions to interact with the firmware and convert the common instructions into specific instructions for a particular type of the target machine; and receiving, by the processor, the data collected from the firmware tool.

16. The non-transitory computer readable storage medium of claim 15, the operations further comprising:
storing the data in a firmware record.

17. The non-transitory computer readable storage medium of claim 15, the operations further comprising:
comparing the data with previously stored data in a firmware record; and
providing the previously stored data to the firmware tool if the data differs from the previously stored data, the firmware tool to apply the previously stored data to the firmware of the target machine.

18. The non-transitory computer readable storage medium of claim 15, wherein receiving the data comprises:
instructing a network management server to collect the data from the firmware tool; and
receiving the data from the network management server.

19. The non-transitory computer readable storage medium of claim 15, wherein the firmware tool is contained in a disk image.

20. The non-transitory computer readable storage medium of claim 15, wherein providing the firmware tool comprises:
instructing a helper client on the target machine to retrieve the firmware tool.

21. The non-transitory computer readable storage medium of claim 15, wherein providing the firmware tool comprises:
transmitting the firmware tool to the target machine over a network; and
sending instructions to alter a power state of the target machine after transmitting the firmware tool.

* * * * *